(12) United States Patent
Root et al.

(10) Patent No.: US 6,501,479 B1
(45) Date of Patent: Dec. 31, 2002

(54) MULTI-FORMAT VERTEX DATA PROCESSING APPARATUS AND METHOD

(75) Inventors: Gary W. Root, Harleysville, PA (US); Richard J. Selvaggi, Doylestown, PA (US)

(73) Assignee: ATI International SRL (BB)

( * ) Notice: Subject to any disclaimer, the term of this patent is extended or adjusted under 35 U.S.C. 154(b) by 0 days.

(21) Appl. No.: 09/337,293

(22) Filed: Jun. 21, 1999

(51) Int. Cl.[7] .................................................. G06T 1/60
(52) U.S. Cl. ...................... 345/530; 345/503; 345/441; 345/428; 341/67
(58) Field of Search ................................. 345/530, 503, 345/441, 619, 426, 428; 341/63, 67

(56) References Cited

U.S. PATENT DOCUMENTS

| | | | | |
|---|---|---|---|---|
| 5,408,605 A | * | 4/1995 | Deering | 395/523 |
| 5,566,283 A | * | 10/1996 | Modegi et al. | 395/126 |
| 6,172,684 B1 | * | 1/2001 | Lapidous | 345/443 |
| 6,181,355 B1 | * | 1/2001 | Brethour et al. | 345/523 |

\* cited by examiner

*Primary Examiner*—Mark Zimmerman
*Assistant Examiner*—Mackly Monestime
(74) *Attorney, Agent, or Firm*—Vedder, Price, Kaufman & Kammholz

(57) ABSTRACT

An apparatus and method allows efficient processing of vertex data received in any suitable format. The method and apparatus accesses stored vertex data that may be stored in a plurality of different formats. A single copy of the received vertex data is stored in memory so that the system does not require a block of memory containing differing formats of the vertex data. The apparatus and method utilizes a universal vertex data fetching mechanism which controls retrieval of vertex data stored in the first format in memory based on multi-format description data. As such, the vertex data that may be received in one of a plurality of formats, is effectively coded so that a data fetcher may appropriately fetch vertex parameter data from suitable addresses independent of the format in which the vertex data was received.

19 Claims, 7 Drawing Sheets

(BLOCK 402)

MULTI-FORMAT VERTEX DATA PROCESSING APPARATUS AND METHOD

FIELD OF THE INVENTION

The invention relates generally to graphics processing devices and methods and more particularly to devices and methods for accessing stored vertex data that may be stored in a plurality of different formats.

BACKGROUND OF THE INVENTION

Typically, graphics devices and methods use vertex data to draw lines, triangles, and to provide texture mapping for output to a visual display device. As a result, some drawing engines or video games provide vertex data to a graphics drawing engine on a graphics processor, for example, and the graphics processor then performs the necessary calculations to draw lines and triangles using the vertex data. Vertex data is typically used to figure out how and where to draw lines and triangles. Three-dimensional shading and lighting is typically done by drawing many triangles with the appropriate shading to give a visual representation of a suitable texture to a figure or suitable lighting for a scene. Vertex data typically includes a plurality o vertex parameters which may include, for example, X coordinate position data, Y coordinate position data, Z coordinate position data, homogeneous coordinate positions for perspective correction, texture coordinates, diffuse color parameters and specular color parameters or any other suitable parameters.

A problem arises when a graphics processor receives the vertex data, such as the vertex parameters, in different formats from differing vertex data providers. For example, one software application may put the vertex data in one format whereas another software application may put the vertex data to the graphics processor in a different format. Conventional graphics processors typically have software that receives the vertex data in one format and stores the vertex data in its original format in memory. If the format is not understood by the graphics processor, the software module typically reformats the vertex data in a suitable format, namely a single format understood by the graphics processor and restores the reformatted vertex data in memory. A problem arises in that such systems can waste enormous amounts of time to fetch and restore the data from the first format and store the data again in memory in a second format. This typically is done every time a software application provides data, namely vertex data for the graphics processor. In addition, such systems may typically use twice the memory for the same period of time because the rearranging of the vertex data requires storage of the data in the original format as well as storage of the data in the single format understood by the graphics processor.

Consequently, a need exists for an apparatus and method for improving the efficiency of the graphics processing device by substantially reducing the memory requirements when differing formats of vertex data are received and improving system performance by substantially eliminating the need to read and restore vertex data in undesirable formats.

DETAILED DESCRIPTION OF A PREFERRED EMBODIMENT OF THE INVENTION

Briefly, an apparatus and method allows efficient processing of vertex data received in any suitable format. The method and apparatus accesses stored vertex data that may be stored in a plurality of different formats. A single copy of the received vertex data is stored in memory so that the system does not require a block of memory containing differing formats of the vertex data. The apparatus and method utilizes a universal vertex data fetching mechanism which controls retrieval of vertex data stored in the first format in memory based on multi-format description data. As such, the vertex data may be received in one of a plurality of different formats, and is effectively coded (indexed) so that a data fetcher may appropriately fetch vertex parameter data independently of the format in which the vertex data was originally received.

Figure 1:
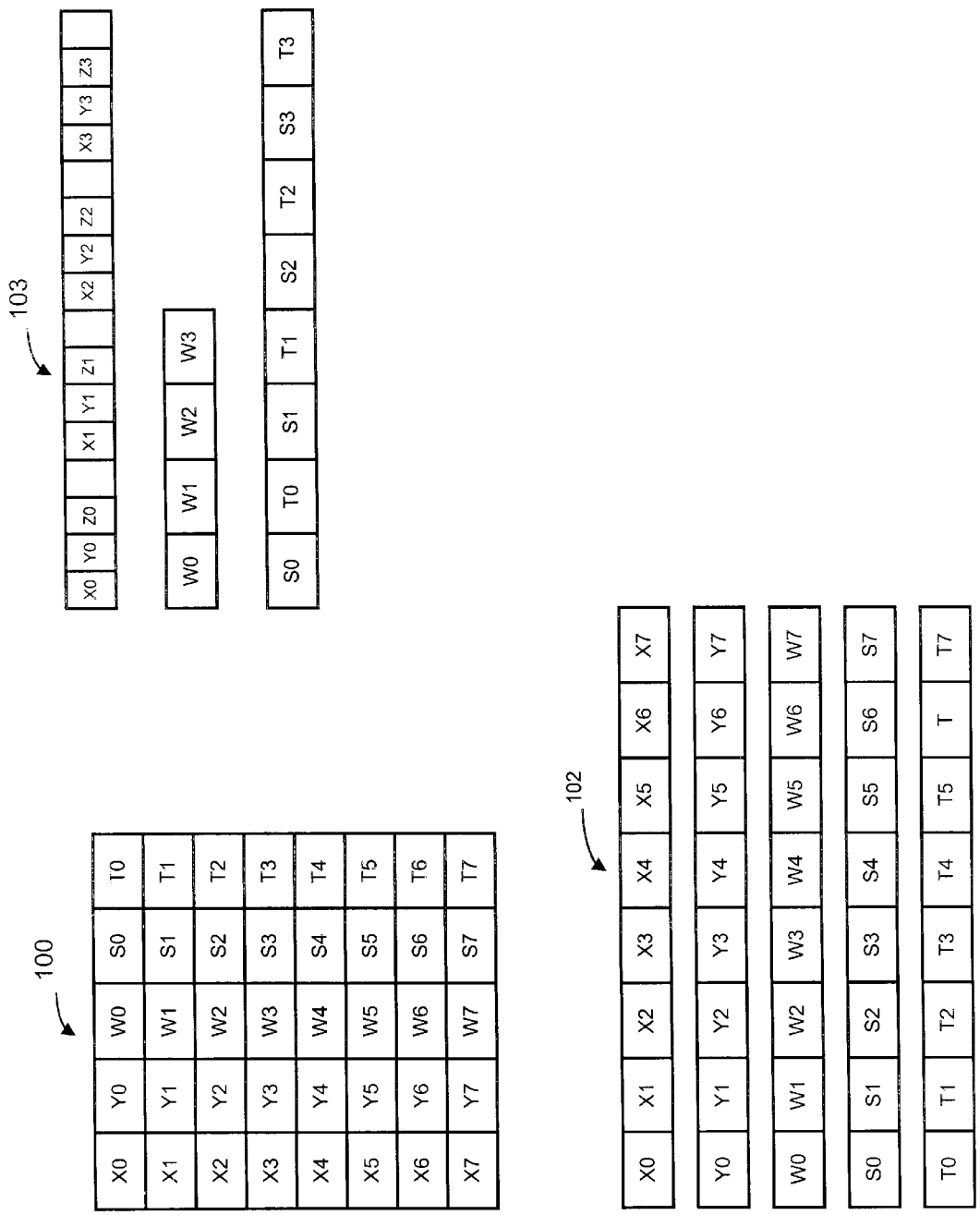
FIG. 1 is a graphic illustration showing three different vertex data formats as known in the art, that may be received, for example, by a graphics processing device.

FIG. 1 illustrates three different formats of vertex data in formats 100, 102 and 103. These formats, as known in the art, may be generated and provided to a graphics processing engine. In format 100, for example, known as an array of structures format (AOS), the vertex data is formatted having a base address containing, in this example, one structure wherein a structure is defined as a contiguous group of vertex parameter data namely, in a common base address. For example, as represented here, vertex parameter data X0 corresponds to X position data, Y0 corresponds to Y position data, W0 corresponds to a homogeneous coordinate for perspective correction, and SO and TO represent texture coordinates, as known in the art. As also shown, in format 100 the vertex parameters are illustrated as an array of structures wherein each structure has five elements, namely X, Y, W, S and T. There are eight vertices represented in this array. Each element of the structure serves as one type of vertex parameter.

Format 102 illustrates a multiple array without structure (sometimes referred to structure of arrays) wherein eight vertices are represented as five arrays. However, there is no structure since the vertex parameters are not stored in contiguous memory. For example, the vertex parameters, like X0 or W0 are stored in a separate array. To get all of the data for a vertex, a graphics processor must look into several different arrays.

In vertex format 103, a strided vertex format is shown which is a type of hybrid between the vertex arrays of format 100 and format 102. In this example, each vertex has X, Y, Z, W, S, and T parameters. These parameters are grouped into three types of structures. The first type has three parameters (namely X, Y, Z), the second type has one parameter (namely W), and the third type has two parameters (namely S, T). Each of these three types of structures is repeated once per-vertex, to form three arrays. That is, each element of each array is a structure, containing some parameters (i.e., vertex parameter data) for a single vertex.

Figure 2A:
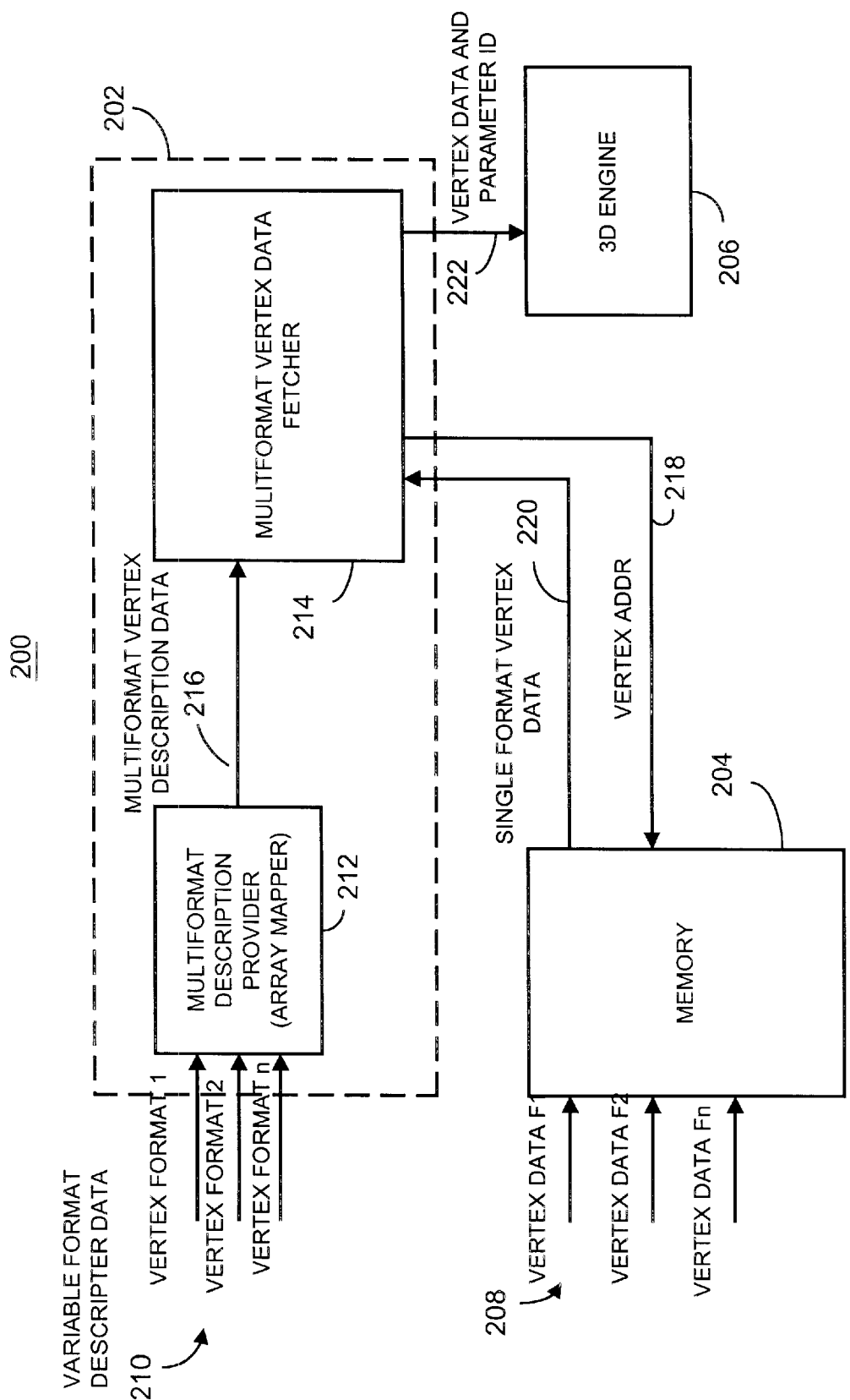
FIG. 2a is a block diagram illustrating one example of a vertex data format independent graphics processing apparatus in accordance with one embodiment of the invention.

FIG. 2a illustrates one embodiment of a graphics processing device 200 that includes a multi-format vertex data translator 202 for accessing stored vertex data that may be stored in one of a plurality of different formats (such as formats 100, 102 and 103) in memory 204. The graphics processing device 200 includes a drawing engine, such as a three-dimensional graphics engine 206. The memory 204 receives one or more arrays of vertex data in different formats indicated as vertex data format 1, vertex data format 2 and vertex data format n, generally indicated as 208. Corresponding to the actual vertex data, is variable format descriptor data 210 indicating, as known in the art, the format of the vertex data stored in memory. The variable format descriptor data 210 serves as variable vertex format information which defines the format of each of the variable format vertex data 208. The variable format descriptor data 210 is typically included by a software application that provides the vertex data to the graphics processor 200. This variable vertex format information may include bits, for example, that indicate that the vertex data being stored in memory is of an AOS type, unstructured array type or strided vertex data-type array or other suitable type.

The multi-format vertex translator 202 includes a multi-format description provider 212 and a multi-format vertex data fetcher 214. The multi-format description provider 212 generates multi-format description data 216 from the variable vertex format information 210. The multi-format vertex data fetcher 214 controls retrieval of vertex data stored in the first format in memory based on the multi-format description data 216. Retrieval of the vertex data in a different format occurs when the 3D engine 206 requires that the vertex data be translated in a different format from the format of the vertex data stored in memory 204. As such, the multi-format vertex data fetcher serves as a type of address generator that provides the vertex address 218 containing the vertex data 220 corresponding to the second vertex format understood by the 3D engine 206. The multi-format vertex data fetcher 214 communicates the retrieved vertex data 220 in a second format suitable for the graphics processing unit, such as the 3D engine 206, by providing vertex data and vertex parameter identification data 222 in a format different from the format of the vertex data stored in memory 204.

Figure 3A:
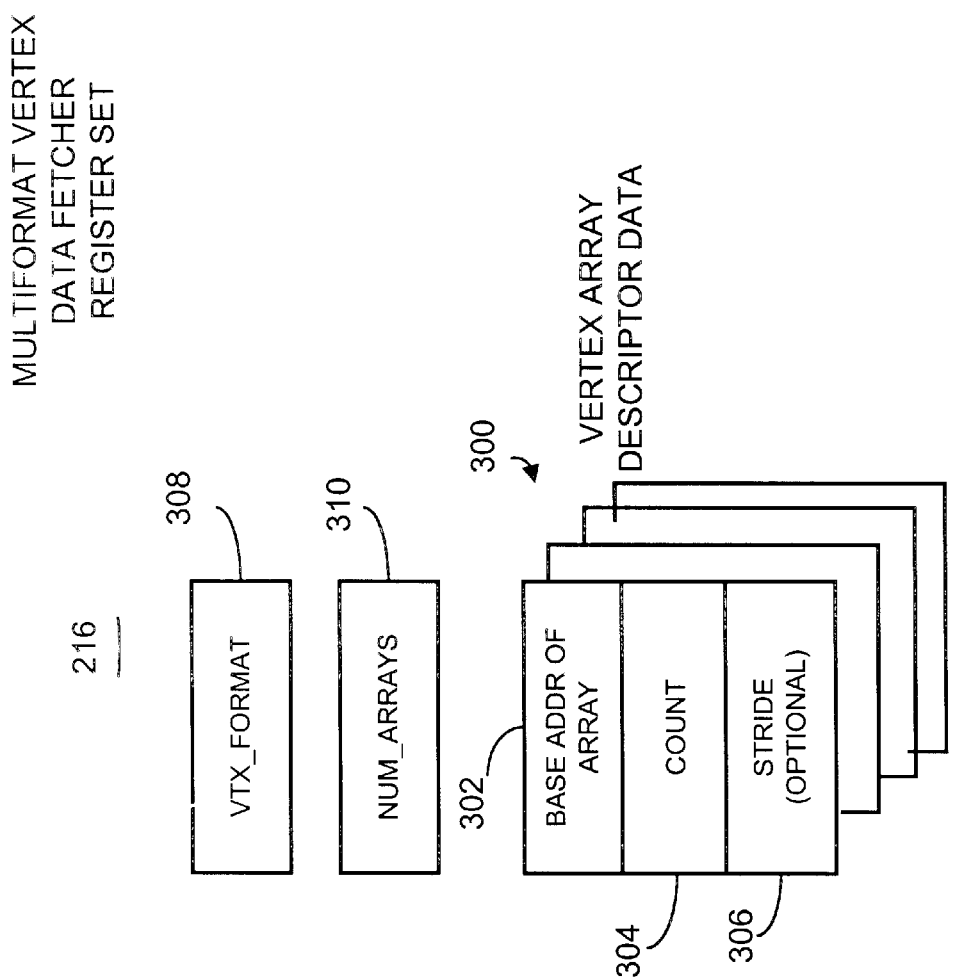
FIG. 3a is a graphic illustration showing vertex array descriptor data stored in registers in accordance with one embodiment of the invention.

The multi-format description provider 212 populates the register set shown in FIG. 3a. The multi-format description provider 212 decodes variable vertex format information, provided by the application software, in order to generate the multi-format vertex description data 216. This decoding is accomplished by means of a "case" statement, "for" loop, look-up table, or other suitable mechanism, as described below.

The multi-format description provider examines the variable vertex format information for the first two vertices (e.g., Vertex A and Vertex B) in order to generate values to load into the register set. The software application provides a description of which parameters are present in each vertex, and this information is coded into the vertex format register (VTX_FORMAT), for example, as a bit-array, with each bit representing whether a specific parameter is present in the vertex data.

The application's order of parameters residing in memory is compared with the order of parameters that the multi-format vertex data fetcher has the ability to fetch. Each time the orders differ will require an additional array descriptor to be programmed. The address of the parameter that is out-of-order is programmed into the base address register for this descriptor. The number of parameters of Vertex A that are in the vertex fetcher's order, and are contiguous in memory, is programmed into the count register of this descriptor. The distance, for example in bytes, from the out-of-order parameter of Vertex A to the same parameter of Vertex B is programmed into the stride register for this descriptor.

Also, the first parameter, and each incident that a parameter for a single vertex is not stored contiguously in memory will require an additional array descriptor to be programmed. The address of the parameter that is not contiguous is programmed into the base address register for this descriptor. The number of parameters of Vertex A that are in the vertex fetcher's order, and are contiguous in memory, is programmed into the count register of this descriptor. The distance, for example in bytes, from the discontiguous parameter of Vertex A to the same parameter of Vertex B is programmed into the stride register for this descriptor. The total count of array descriptors is programmed into the NUM_ARRAYS register.

Figure 2B:
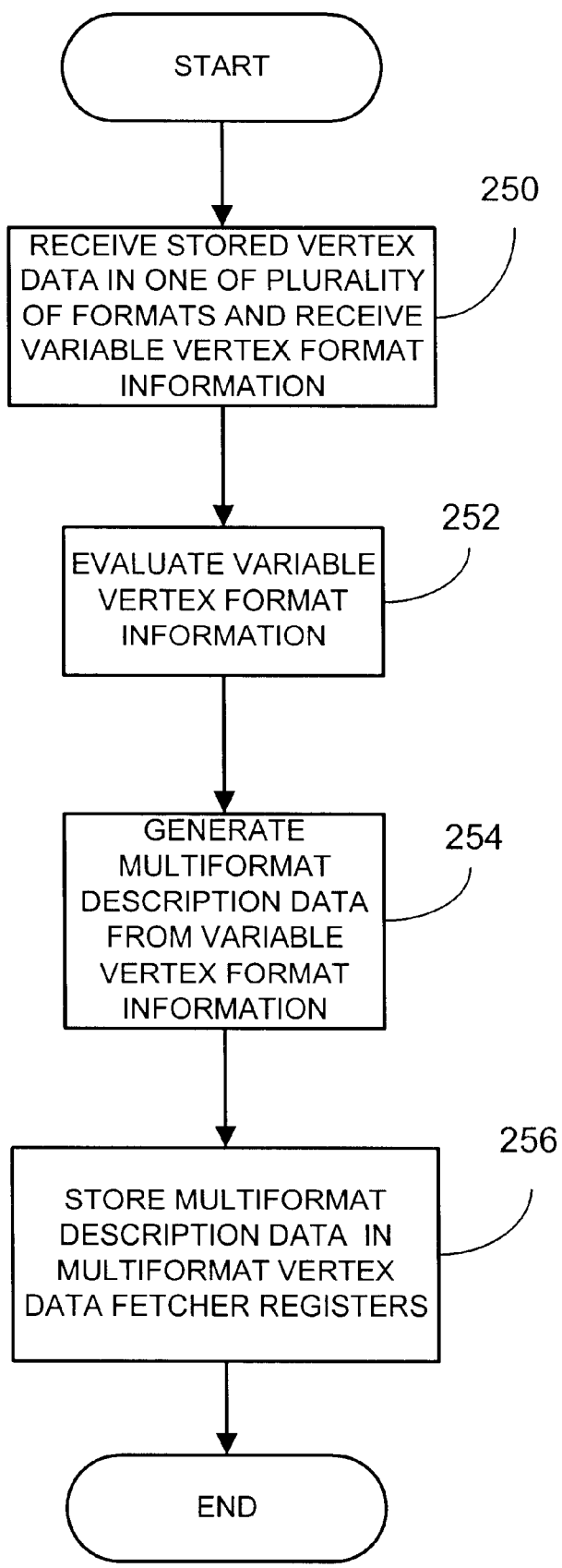
FIG. 2b is a flow chart illustrating the operation of a multiformat description provider in accordance with one embodiment of the invention.

As seen in FIG. 2b, the multi-format description provider receives the variable format descriptor data and the memory receives the stored vertex data in one of a plurality of formats, as shown in block 250. The multi-format description provider evaluates the variable vertex format information as shown in block 252, such as parsing the data. It then generates the multi-format description data from the variable vertex format information. This is shown in block 254. The multi-format description provider then stores the resultant multi-format description data in the multi-format vertex data fetcher registers to control retrieval of first formatted vertex data by the vertex data fetcher. This is shown in block 256.

FIG. 3a shows an example of a multi-format vertex description data 216 stored in a register set. The multi-format description provider 212 generates the multi-format description data 216 translating the variable vertex format information into the vertex array descriptor data 300. The multi-format description data 216 includes vertex array descriptor data 300 that represents, on a per array basis, at least array based address data 302 and count data 304 representing a number of vertex parameters per structure per array. In addition, if desired, the vertex array descriptor data 300 may also include stride data. For example, where each element in an array is a double word (D-word), the base address data 302 points to the beginning of the array. The count data 304 indicates the number of D-words of vertex data in this array. The stride data 306 is the number of D words to the next structure in the array of structures.

For example, the AOS vertex format 100 in FIG. 1 with five parameters would be represented as multi-format vertex description data with a single array which consists of five D words with a stride of five D words. The unstructured array indicated by format 102 in FIG. 1 may be represented with five arrays. Each array would have a count of 1 and a stride of 1. The format 103 in FIG. 1 would be represented, for example, with three arrays. The first array would have a count of three and a stride of four. The second array would have a count of one and a stride of one. The third array would have a count of two and a stride of two. It will be recognized that any suitable implementation of the multi-format description data may have a different maximum number of arrays of structures.

The register set for the multi-format description data 216 also includes a vertex format register 308 containing data representing the variable vertex format information indicating, for example, which vertex parameters are present per vertex. In addition, a register 310 may also be used indicating the number of arrays for a given set of vertex data.

Figure 3B:
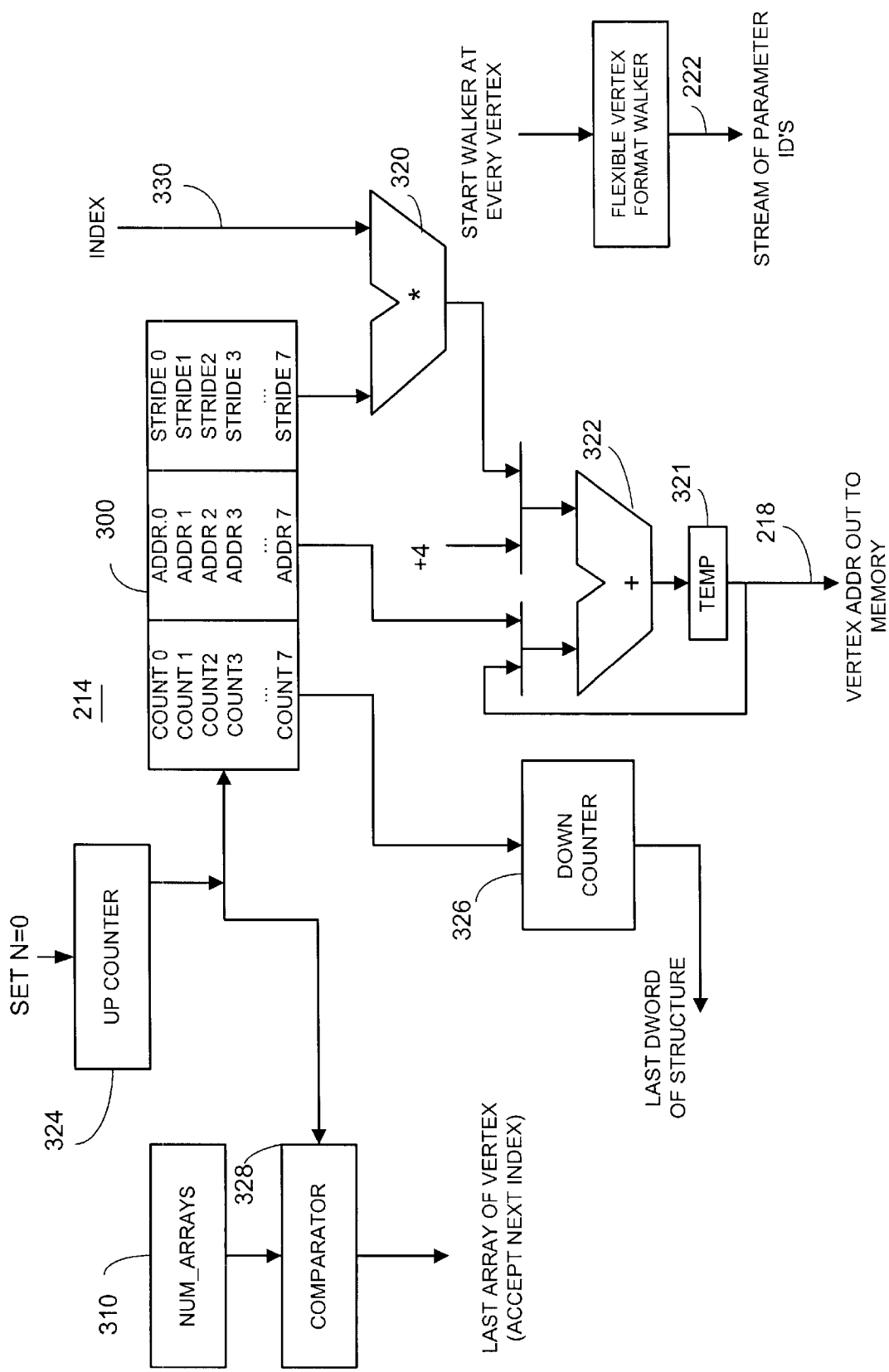
FIG. 3b is a block diagram illustrating one embodiment of an address generator to facilitate format independent vertex data processing in accordance with one embodiment of the invention.

FIG. 3b illustrates one example of a multi-format vertex data fetcher 214. The multi-format vertex data fetcher 214 is primarily configured as an address generator that generates the vertex address 218 to retrieve the appropriate vertex data 220 from memory by retrieving the vertex data in a different format from the format that the data is stored in memory 204. As such, the drawing engine 206 receives data in a different format from the format of the vertex data stored in memory 204. A multi-format vertex data fetcher controlled by multi-format vertex description data and suitable control logic, controls a vertex data address generator to obtain stored vertex parameters for the graphics processor consistent with the different format understood by the graphics processor (or drawing engine).

The multi-format vertex data fetcher 214 uses the vertex array descriptor data in register 300 and the number of arrays data in the register 310 in addition to a multiplier 320, an adder 322, an upcounter 324, a downcounter 326 and a comparator 328. The flexible vertex walker generates vertex parameter identification data 222, and determines how many parameters to fetch per vertex. This is done for example based on the number of bits that are '1' in the VTX_FORMAT register. The multi-format vertex data fetcher 214 also uses index data 330 which indicates a vertex number that needs to be fetched. This index data 330, for example, is determined from the application providing the vertex data. The upcounter increments the count data, the downcounter generates a last structure in a vertex array, and the comparator compares data representing a number of total arrays in a vertex array being translated (e.g., NUM_ARRAYS) and data representing a number of vertex parameters per structure (e.g., the count data) to determine a last array of the vertex array being translated. The adder and multiplier serve to calculate the address according to the following equation: Address=(Index*Stride) +BaseAddr+ (ParameterNumber*4) (assuming that each parameter is 4-bytes in length) The adder and multiplier is controlled to implement the math for the flowchart in FIG. 4.

Figure 5:
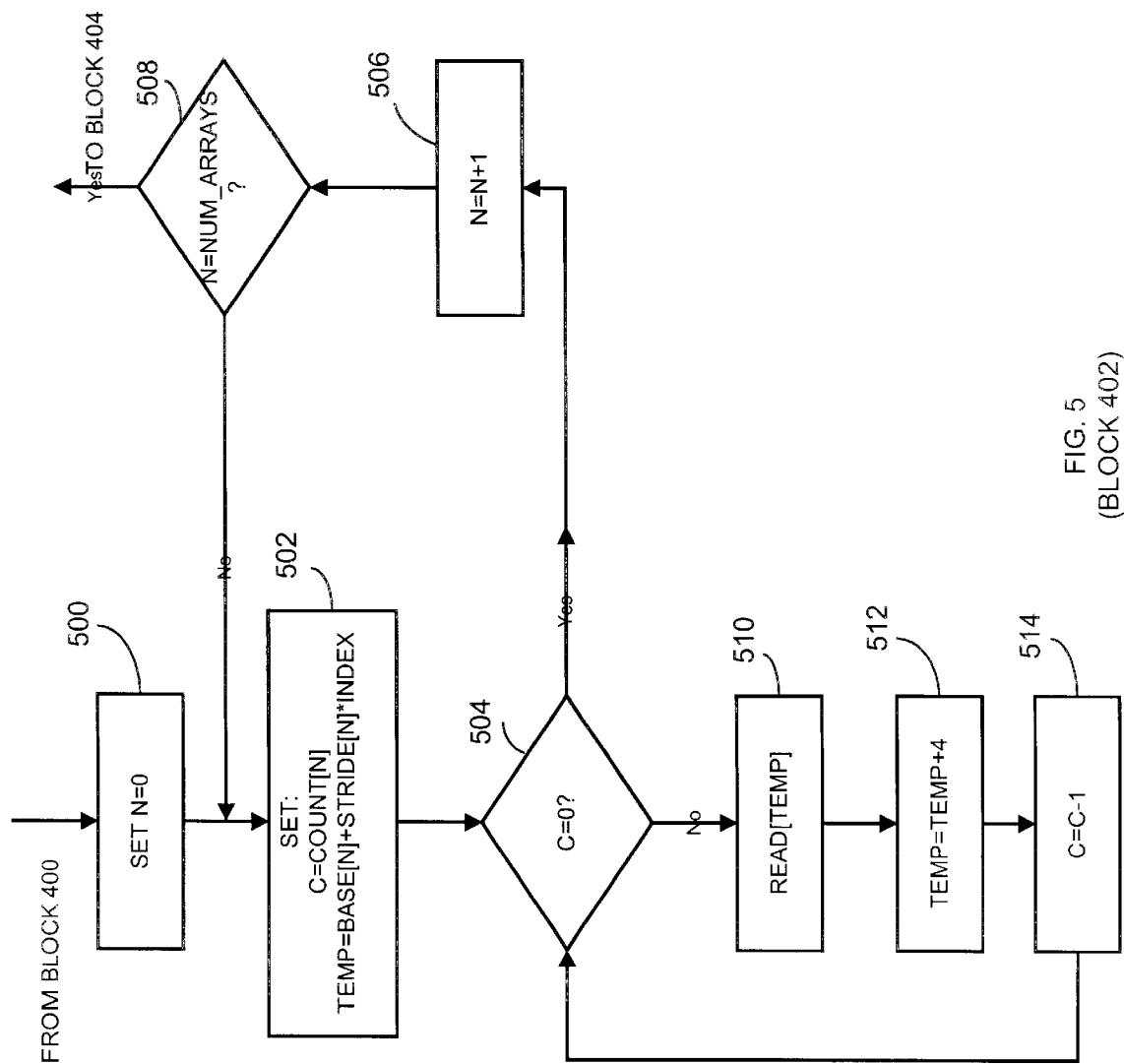
FIG. 5 is a flow chart illustrating the steps performed in block 402 of FIG. 4 in accordance with one embodiment of the invention.

Referring to FIG. 5, the steps carried out to fetch indexed vertex data in block 402 will be described. The access to vertex data may be immediate or by using the index data. In immediate mode, the base address of an array of vertex data is provided. Vertex data is read in the order in which it is stored to produce the desired parameters. This mode is used, for example, when the stored vertex data is already in the format understood by the graphics engine. In indexed mode, a base address to the beginning of the vertex data is provided along with a set of indices defined by the array descriptor data 300. The array descriptor data 300 is used to access vertices in any order. It will be recognized that although represented functionally as being hardware, the multi-format vertex data fetcher may be implemented in software if desired or a combination of hardware and software in any suitable configuration.

Figure 4:
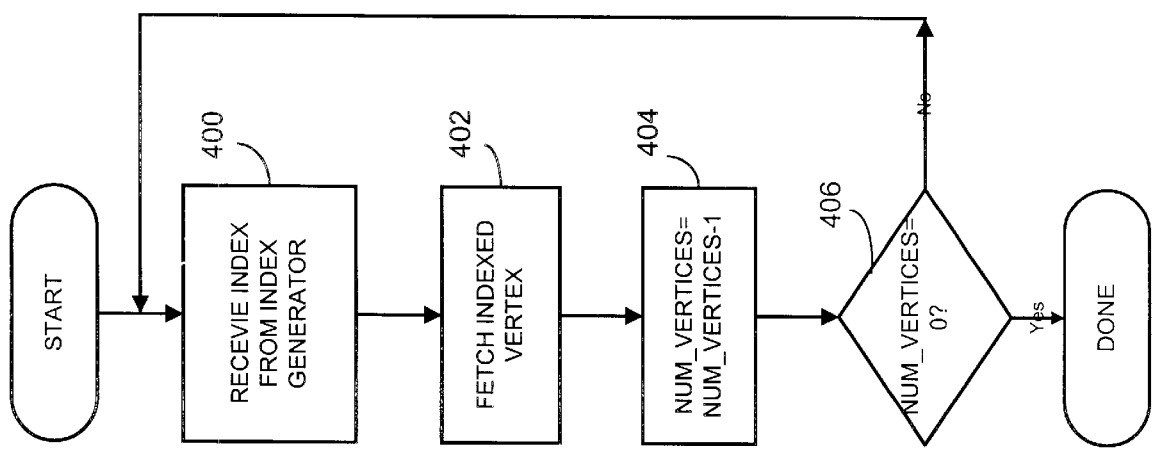
FIG. 4 is a flow chart illustrating the operation of a multi-format vertex data fetcher in accordance with one embodiment of the invention.

Referring to FIGS. 3b, 4 and 5, the operation of the multi-format vertex data fetcher 214 will be described. As shown in block 400, the vertex translator 202 receives index data 330 from an index generator as known in the art. The multi-format vertex data fetcher then fetches the indexed vertex as shown in block 402 based on the multi-format description data in the registers. The data fetcher 214 will continue to fetch the vertex data until all of the vertices have been fetched, as indicated in blocks 404 and 406.

The fetcher sets the upcounter to zero as shown in block 500. As shown in block 502, a variable corresponding to the count data for a given vertex array is set as well as a temporary variable 321, which is set equal to the base address plus the number of any stride for a given vertex parameter multiplied by an index value through multiplier 320. As such, the value and the temp register 321 is provided through the multiplier 320 and adder 322. As shown, the adder adds four to increments to fetch the contiguous parameters in the given structure; as each parameter is 4 bytes in length.

The fetcher, as shown in block 504, then determines whether the count, which is the number of vertex parameters per structure, is equal to zero. If it is, meaning that the processing of this structure is complete, and it is time to move to the next array, then the upcounter is incremented as shown in block 506 and the fetcher determines if the count in the upcounter is equal to the number of arrays as shown in block 508. If the upcounter value is equal to the number of arrays indicating that all the arrays have been fetched for a given parameter data set, the fetcher then goes to block 504. However, if the upcounter value is not equal to the number of arrays indicating that additional vertex parameters are required, the fetcher then obtains the next vertex parameter as shown in block 502.

Returning to block 504, if the count value in count register 304 is not equal to zero, the fetcher then reads the value in the temp register as shown in block 510 and then sets the value equal to temp plus four, shown in block 512 Next, the fetcher decrements the count using the down counter 326 as indicating in block 514. The process is continued until all vertex parameters indicated by the addresses stride and count registers for a particular number of arrays have been obtained.

As previously indicated, the vertex data consists of a set of vertex parameters. A set of vertex parameters can be changed from one group of geometric primitives to the next. Geometric primitives are for example, points, lines, triangles, etc as known in the art.

Accordingly, the aforedescribed device and method provides a more universal processing of vertex formats without requiring reformatting and subsequent storage of the reformatted data. It should be understood that the implementation of other variations and modifications of the invention in its various aspects will be apparent to those of ordinary skill in the art, and that the invention is not limited by the specific embodiments described. It is therefore contemplated to cover by the present invention, any and all modifications, variations, or equivalents that fall within the spirit and scope of the basic underlying principles disclosed and claimed herein.

What is claimed is:

1. A method for accessing stored vertex data that may be stored in a plurality of different formats comprising the steps of:
   receiving variable vertex format information defining at least a first format of variable format vertex data;
   generating multiformat description data from the variable vertex format information;
   controlling retrieval of vertex data stored in the first format based on the multiformat description data; and
   communicating the retrieved data in a second format suitable for a graphics processing unit.

2. The method of claim 1 wherein the multiformat description data includes vertex array descriptor data representing, on a per array basis, at least array based address data and a number of vertex parameters per structure.

3. The method of claim 2 wherein the step of generating multiformat description data includes mapping the variable vertex format information into the vertex array descriptor data.

4. The method of claim 1 wherein the graphics processing unit receives data in a different format from the first format and wherein the step of controlling retrieval of vertex data stored in the first format includes the step of controlling a vertex data address generator to obtain stored vertex parameters for the graphics processing unit consistent with the different format.

5. The method of claim 2 wherein the step of generating the multiformat description data includes generating array data representing a number of arrays to be processed and generating data representing which parameters are present per vertex.

6. The method of claim 5 including the step of storing the array based address data, the number of vertex parameters per structure, the array data representing a number of arrays to be processed and the vertex parameter data as register data.

7. The method of claim 1 including generating vertex array descriptor data representing, on a per array basis, at least array based address data, a number of vertex parameters per structure and stride data representing a number of bits to a next structure in an array of structures.

8. An apparatus for accessing stored vertex data that may be stored in a plurality of different formats comprising:
   a multiformat description provider operative to receive variable vertex format information defining at least a first format of variable format vertex data and operative to generate multiformat description data from the variable vertex format information; and
   a multiformat vertex data fetcher operative to control retrieval of vertex data stored in the first format based on the multiformat description data; and communicate the retrieved data in a second format suitable for a graphics processing unit.

9. The apparatus of claim 8 wherein the multiformat description data includes vertex array descriptor data representing, on a per array basis, at least array based address data and a number of vertex parameters per structure.

10. The apparatus of claim 9 wherein the multiformat description provider maps the variable vertex format information into the vertex array descriptor data.

11. The apparatus of claim 8 wherein the graphics processing unit receives data in a different format from the first format and the multiformat vertex data fetcher controls retrieval of vertex data stored in the first format and includes a vertex data address generator that obtains stored vertex parameters for the graphics processing unit consistent with the different format.

12. The apparatus of claim 9 wherein the multiformat description provider generates array data representing a number of arrays to be processed and vertex parameter data.

13. The apparatus of claim 12 including a set of registers containing the array based address data, the number of vertex parameters per structure, the array data representing a number of arrays to be processed and the vertex parameter data as register data.

14. The apparatus of claim 9 wherein the multiformat vertex data fetcher processes vertex array descriptor data representing, on a per array basis, at least array based address data, a number of vertex parameters per structure and stride data representing a number of bits to a next structure in an array of structures.

15. The apparatus of claim 7 wherein the multiformat vertex data fetcher comprises an upcounter operatively responsive to increment count data, a downcounter operatively responsive to generate a last structure in a vertex array, and a comparator operatively responsive to compare data representing a number of total arrays in a vertex array being translated and data representing a number of vertex parameters per structure to determine a last array of the vertex array being translated.

16. An apparatus for accessing stored vertex data that may be stored in a plurality of different formats comprising:
   a multiformat description provider operative to receive variable vertex format information defining at least a first format of variable format vertex data and operative to generate multiformat description data from the variable vertex format information, wherein the multiformat description data includes vertex array descriptor data representing, on a per array basis, at least array based address data and a number of vertex parameters per structure and wherein the multiformat description provider maps the variable vertex format information into the vertex array descriptor data and
   a multiformat vertex data fetcher operative to control retrieval of vertex data stored in the first format based on the multiformat description data; and
   communicate the retrieved data in a second format suitable for a graphics processing unit and wherein the graphics processing unit receives data in a different format from the first format and the multiformat vertex data fetcher controls retrieval of vertex data stored in the first format and includes a vertex data address generator that obtains stored vertex parameters for the graphics processing unit consistent with the different format.

17. The apparatus of claim 16 wherein the multiformat description provider generates array data representing a number of arrays to be processed and vertex parameter data.

18. The apparatus of claim 17 including a set of registers containing the array based address data, the number of vertex parameters per structure, the array data representing a number of arrays to be processed and the vertex parameter data as register data.

19. The apparatus of claim 16 wherein the multiformat vertex data fetcher processes vertex array descriptor data representing, on a per array basis, at least array based address data, a number of vertex parameters per structure and stride data representing a number of bits to a next structure in an array of structures.

* * * * *